No. 606,677. Patented July 5, 1898.
J. MORRISON & H. P. HANSEN.
PIPE COUPLING.
(Application filed Aug. 13, 1897.)
(No Model.)
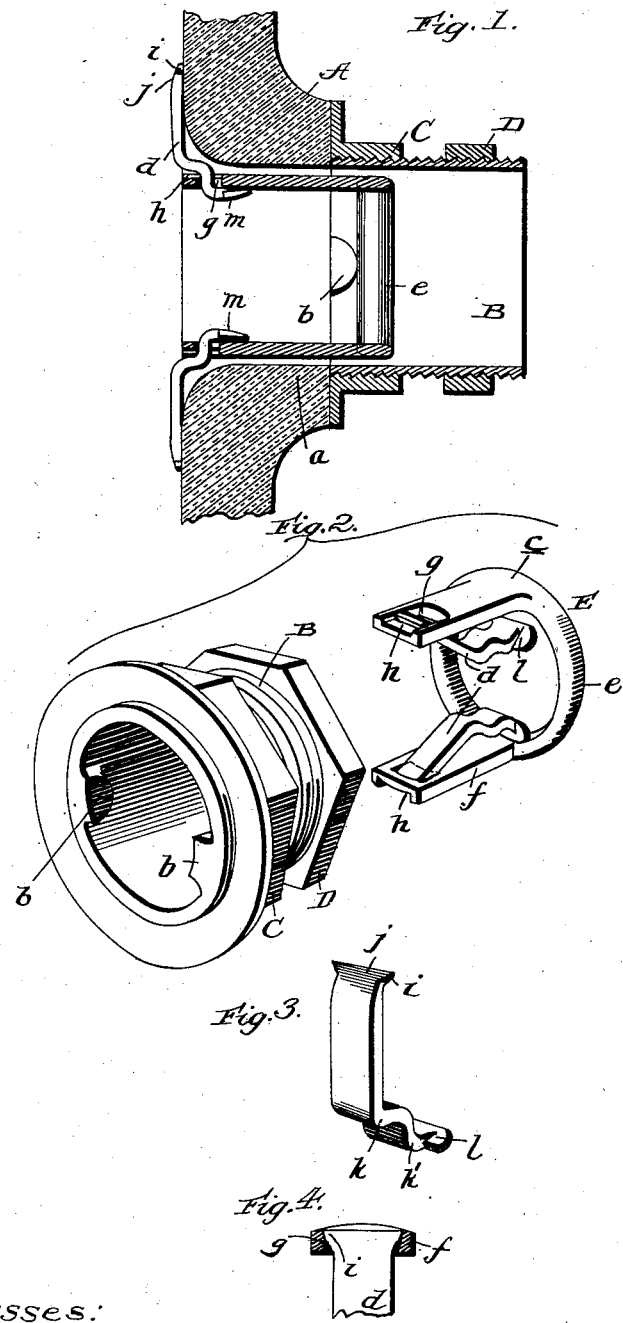

UNITED STATES PATENT OFFICE.

JAMES MORRISON AND HANS PETER HANSEN, OF SEATTLE, WASHINGTON.

PIPE-COUPLING.

SPECIFICATION forming part of Letters Patent No. 606,677, dated July 5, 1898.

Application filed August 13, 1897. Serial No. 648,153. (No model.)

*To all whom it may concern:*

Be it known that we, JAMES MORRISON and HANS PETER HANSEN, citizens of the United States, residing at Seattle, in the county of King and State of Washington, have invented certain new and useful Improvements in Pipe-Couplings; and we do declare the following to be a full, clear, and exact description of the invention, such as will enable others skilled in the art to which it appertains to make and use the same.

Our invention relates to that class of pipe-couplings which are designed especially for connecting a pipe with a water-closet bowl from which the horn has been broken or omitted; and its novelty and advantages will be fully understood from the following description and claims when taken in conjunction with the accompanying drawings, in which—

Figure 1 is a vertical section illustrating a portion of a water-closet bowl with our improved coupling connected thereto. Fig. 2 comprises perspective views of the parts of the coupling. Fig. 3 is an enlarged perspective view of one of the fingers of the bowl-engaging grapple, and Fig. 4 is an enlarged detail section illustrating the manner in which the ends of the fingers of the grapple are held against inward movement in the apertures of the body thereof.

In the said drawings similar letters designate corresponding parts in all of the several views, referring to which—

A indicates a portion of a water-closet bowl which has the usual aperture $a$ for the admission of water in its wall.

B indicates the exteriorly-threaded tube, which rests at the outside of the bowl and has a suitable interior stop, preferably lugs $b$, as shown, for a purpose presently described.

C indicates a clamping-nut which is mounted on the tube B and is designed to bear against the outside of the bowl A, as shown.

D indicates a check-nut which is preferably employed to prevent casual movement of the nut C when the same is set up against the bowl and which may also hold a packing-ring against said nut C, and E indicates the grapple for connecting the tube B with the bowl. This grapple E, as better shown in Fig. 2, comprises a body $c$ and fingers $d$, the former being designed to rest in the tube B and aperture $a$ of the bowl and the latter to engage the inner side of the bowl, as shown in Fig. 1, so as to hold the body $c$ and the tube B to the bowl. The body $c$ preferably comprises the annular portion $e$, which is designed to rest in the tube B and engage the lugs $b$ thereof, and the arms $f$, which are formed integral with the annular portion and are designed to extend through the opening $a$ in the bowl, as shown. These arms $f$ are provided, adjacent to their ends, with transverse apertures $g$, and they are also provided in their outer sides, between the apertures $g$ and their ends, with recesses $h$, the purpose of which will be presently described.

The fingers $d$ of the grapple E are each formed in one piece, and in the preferred embodiment of our invention they have their outer ends slightly enlarged, as indicated by $i$, so as to permit of said ends being passed in a diagonal position through the openings $g$ and yet prevent them from moving backward or inwardly through said openings when the fingers are in the position shown in Fig. 2. Said ends of the fingers $d$ are also preferably beveled, as indicated by $j$, so as to enable them to rest flush with the outside of the grapple-body $c$, when the fingers $d$ are in the position shown in Fig. 2, to permit of the grapple being inserted in the aperture $a$ of the bowl, from the outside thereof. The fingers $d$ are further provided with the shoulders $k$, which are designed to rest in the recesses $h$ of the body $c$ and bear against the outer side of the same when the fingers are in the position shown in Fig. 1; the shoulders $k'$, which are designed to bear against the inner walls of the openings $g$ when the fingers are in the position shown in Fig. 1, and the enlargements $l$ at their inner ends, which enlargements, with the fingers in the position stated, are designed to bear against the inner side of the body $c$—that is to say, the inner sides of the arms $f$ thereof. These enlargements $l$ (see Fig. 1) are preferably beveled, as indicated by $m$, so as to prevent them from obstructing the passage of water.

In the practical operation of the invention the grapple E, with the fingers in the position shown in Fig. 2, is placed in the tube B, so that the annular portion $e$ of the body of the grapple bears against the lugs $b$ of the tube, as shown in Fig. 1. The grapple is now inserted in the aperture $a$ of the bowl to the position shown in Fig. 1, and a stick or other suitable implement is introduced through the tube B and pushed against the inner ends of the fingers $d$, so as to cause the same to assume the position shown in Fig. 1. The nut C on the tube B is then turned up tight against the bowl A, when the said tube B will be securely connected with the bowl. The check-nut D, if the same is employed, is then turned up against the nut C, so as to prevent casual turning of the same and the consequent loosening of the coupling. The flush-pipe may be threaded to engage threads on the tube B, or the connection between said tube and the flush-pipe may be effected in any other suitable manner.

The body $c$ of the grapple E is of a less diameter than the interior of the tube B and opening $a$, so as to permit said grapple-body to play in said tube and opening $a$. The lugs $b$ of the tube B are also rounded, as better shown in Fig. 1. Consequently it will be seen that in the event of the bowl A being thicker at one side of the opening $a$ than at the other the grapple-body $c$ is enabled to assume such a position in the tube and bowl-opening as to enable the fingers $d$ of the grapple to engage the bowl at opposite points notwithstanding the difference in the thickness of the same.

It will be observed from the foregoing that our improved coupling is very cheap and simple and embodies but a minimum number of parts and that through the medium of the same a connection of a tube to the bowl at the point stated may be quickly and easily effected.

Having thus described our invention, what we claim is—

1. A pipe connection comprising a threaded tube having an interior stop, a nut mounted on said tube, and a grapple having a body arranged in the tube and bearing against the interior stop thereof and provided with a transverse aperture in its wall, and a finger loosely arranged in said aperture and having a portion adapted to bear against the wall thereof, and a portion adapted to bear against the inner side of a water-closet bowl or the like, substantially as specified.

2. A pipe connection comprising a threaded tube having an interior stop, a nut on said tube, a grapple having a body arranged in the tube and bearing against the stop thereof and provided with transverse apertures in its wall, and fingers loosely arranged in said apertures and having enlargements adapted to bear against the inner side of the body, shoulders to engage the walls of the apertures and portions to engage the inner side of a water-closet bowl or the like, substantially as specified.

3. A pipe connection comprising a threaded tube having an interior stop, a nut on said tube, a grapple having a body arranged in the tube and bearing against the stop thereof and provided with transverse apertures in its wall, and fingers loosely arranged in said apertures and having enlargements at their outer ends to hold them in the apertures while the grapple is being placed in position, enlargements at their inner ends adapted to bear against the inner side of the body, shoulders to engage the walls of the apertures in the body, shoulders to engage the outside of the body and portions to engage the inner side of a water-closet bowl or the like, substantially as specified.

4. A pipe connection comprising a threaded tube having one or more interior stops rounded or convex on their sides contiguous to the outer end of the tube, a nut on said tube, and a grapple having a body of less diameter than the tube arranged in the same and bearing against and adapted to rock upon the rounded stops thereof and provided with transverse apertures in its wall, and fingers loosely arranged in said apertures and having enlargements adapted to bear against the inner side of the body, shoulders to engage the walls of the apertures and portions to engage the inner side of a water-closet bowl or the like, substantially as specified.

In testimony whereof we affix our signatures in presence of two witnesses.

JAMES MORRISON.
HANS PETER HANSEN.

Witnesses:
T. H. LEE,
FRANK G. PETERSEN.